SYLLABIC FREQUENCY DISCRIMINATOR

Filed May 26, 1951 6 Sheets-Sheet 1

INVENTORS:

*Cornelis Bevoort*

*Raimond Edouard Marie Baudet*

*By Brown, Jackson, Boettcher & Dienner*

*Att'ys.*

Dec. 17, 1957 C. BEVOORT ET AL 2,817,014

SYLLABIC FREQUENCY DISCRIMINATOR

Filed May 26, 1951 6 Sheets-Sheet 2

INVENTORS:

Cornelis Bevoort
Raimond Edouard Marie Baudet
By Brown, Jackson, Boettcher & Dienner
Att'ys.

INVENTORS:
Cornelis Bevoort
Raimond Edouard Marie Baudet
By Brown, Jackson, Boettcher & Dienner
Att'ys.

SYLLABIC FREQUENCY DISCRIMINATOR

Filed May 26, 1951 6 Sheets-Sheet 4

INVENTORS:
Cornelis Bevoort
Raimond Edouard Marie Bautet
By Brown, Jackson, Boettcher & Dienner
Attys.

SYLLABIC FREQUENCY DISCRIMINATOR

INVENTORS:

Cornelis Bevoort
Raimond Edouard Marie Baudet
By Brown, Jackson, Boettcher & Dienner
Att'ys.

INVENTORS:
Cornelis Bevoort
Raimond Edouard Marie Baudet
By Brown, Jackson, Boettcher & Dienner
Att'ys.

2,817,014
Patented Dec. 17, 1957

2,817,014

SYLLABIC FREQUENCY DISCRIMINATOR

Cornelis Bevoort and Raimond Edouard Marie Baudet, The Hague, Netherlands, assignors to Staatsbedrijf der Posterijen, Telegrafie en Telefonie, The Hague, Netherlands Application May 26, 1951, Serial No. 228,394

Claims priority, application Netherlands June 16, 1950

10 Claims. (Cl. 250—27)

The invention relates to a system for effecting automatic control of the speech current level, and particularly on a line section or at the output of a radio-receiver.

A device of this kind has been described in the U. S. patent application Ser. No. 189,412, filed by Bevoort, et al. on October 10, 1950, now Patent No. 2,791,743, and further associated control equipment has been described in our patent application Ser. No. 189,411, which was filed October 10, 1950, and assigned to the assignee of this invention.

A characteristic of this system is the simple manner in which the output level of a radio receiver or other similar apparatus may be regulated.

The invention provides an automatic volume regulator which is in a high degree independent of the occurrence of noise, whistling, etc., which appears on the input side thereof. This result has been secured by means of a device which determines the presence of speech of usable level which particularly responds to telephone currents occurring in the mixture of alternating currents applied to the input side of the apparatus.

According to the invention this device, which will be called discriminator hereinafter in one embodiment, consists of a preamplifier, a first rectifier, an amplifier, a second rectifier and a relay. Briefly, with the receipt of incoming speech, the preamplifier is operative to provide with an associated rectifier and smoothing circuit, a voltage varying in a syllabic rhythm. The syllabic voltage is then amplified, rectified, and fed to a control tube which controls the energization and deenergization of an associated relay inserted in the anode circuit of the control tube, the control operation being effected in accordance with the presence or absence of telephone currents at the input side of the apparatus. Time delay means are included in this arrangement to prevent improper operation of the control stage between the syllables of the incoming words. Further by the application of delayed automatic volume control in the preamplifier stage, the switching times are independent of the signal level.

Another characteristic of the invention is the manner in which the discriminator arrangement is operative in the absence of speech of usable level to switch off the motor regulator before the adjustment of the attenuator to increase its value has been initiated by the minimum level relay of the equipment and permits the operation of the minimum relay before reclosing the circuit to the motor regulator when telephone currents arrive again. As a result undesired starts of the motor, perhaps in a wrong direction, are prevented.

According to the invention the discriminator is insensible to noises of short duration, the discriminator control relay being prevented from attracting its armature until the preamplifier has found its correct adjustment. The means by which this is achieved will be described hereinafter.

Another feature of the invention resides in the utilization of a second variable attenuator under the control of the discriminator which effects either a relatively high or a relatively low degree of attenuation respectively with the absence and presence of speech currents at the input side of the set. In the event that speech current is received, the low degree of attenuation effected by said second attenuator is varied between limits by the adjustable attenuator.

The invention will be explained by means of the annexed drawings in which:

Figure 1 is a general view of the automatic volume regulator;

Figure 2*a* illustrates one embodiment of the discriminator shown in block form in Figure 1;

Figure 2*b* illustrates another embodiment of the discriminator;

Figure 3 sets forth a transmission measuring set for use in the regulator of Figure 1;

Figure 1:
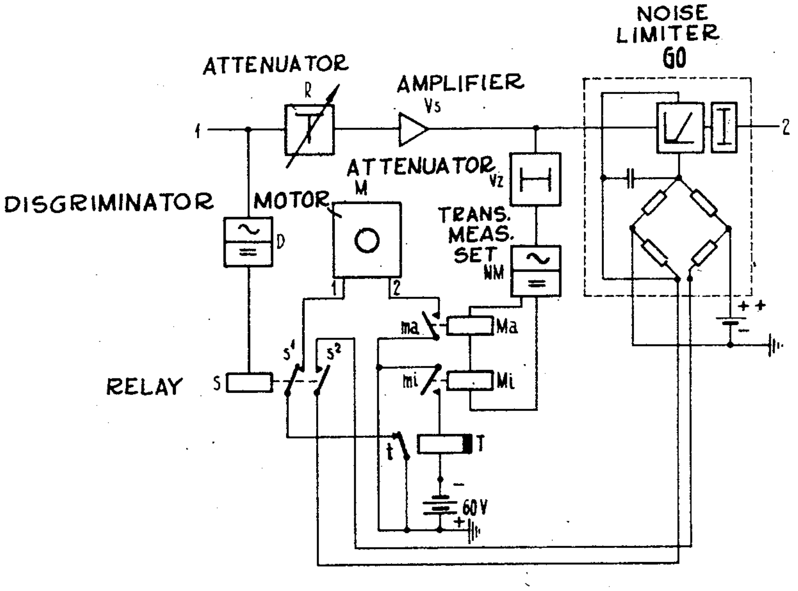
Figure 6:
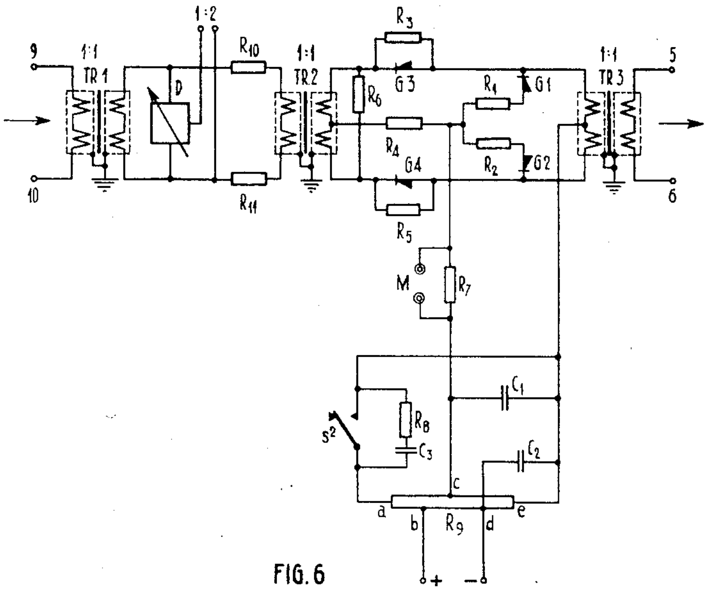

Figure 6 sets forth in detail the second attenuator of Figure 1.

The input circuit 1 of the arrangement of Figure 1 is arranged to be connected to a radio-receiver and as shown in schematic form includes an adjustable attenuator R, an amplifier V*s*, a noise limiter G*o* and an outgoing circuit 2. The radio receiver may be a conventional receiver used in a commercial installation and may be located in a receiving center. Circuit 1—2 may be the beginning of the incoming circuit (half of a four-wire circuit) to a four-wire termination set in the telephone exchange, in which a two-wire circuit leads to the subscriber's premises, and the other half of the four wire circuit leads to a transmitting center.

The discriminator D, which is connected in parallel to the input circuit 1, will effect the release of relay S only with the arrival of speech of a usable level. In the chosen example the limits for an acceptable commercial input level at the input circuit 1 lie between +6 and —34 db. In the absence of such level the discriminator controls relay S to interrupt the motor circuit so that as further speech currents are received the same adjustment is maintained.

The transmission measurement set NM connected via an attenuator V*z* in parallel to the output of amplifier V*s* determines the necessity of re-adjustment. The input level of the illustrated device lies at —5 db, so that by giving attenuator V*z* a suitable attenuation value, such as 11 db, the output level can be kept constant at 6 db. By re-adjusting the attenuator V*z* any desired value can be easily obtained.

In case the level is too high or too low the transmission measuring set will energize its maximum relay M*a*, or cause the release of its minimum relay M*i*, respectively. In both cases the motor M is switched in, but is driven in opposite directions. In the case of a too low level the motor regulator is not immediately switched in by relay M*i*, but by the intermediary of a slowly releasing relay T. This is necessary in order to give the discriminator the time to interrupt the motor circuit in the absence of speech of usable level, in which case the regulator should not operate. This relay T, however, should operate quickly in order to prevent the motor from being switched in when the discriminator relay releases as a result of newly arriving speech.

Figure 2A:
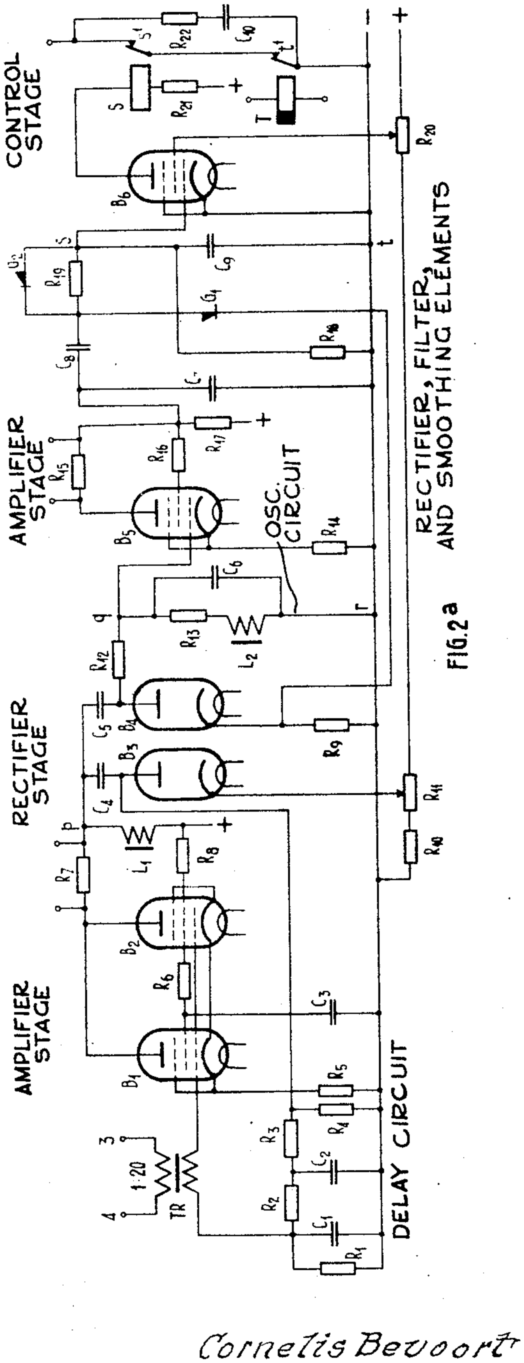

Figure 2*a* sets forth in detail one embodiment of the discriminator. The A. C. voltages found in circuit 1 (Figure 1) are applied to the primary of transformer TR points 3 and 4). The output voltages of transformer TR which are developed across the secondary winding are applied between the grids and cathodes of two tubes B1 and B2, which are connected in parallel. In order to obtain a certain AVC in this tube arrangement, the voltage variations which develop across the self-inductor L1 in the anode circuit are applied via condenser C4 to diode B3. The cathode of the latter is connected to a tap on the potentiometer arrangement $R_{10}$—$R_{11}$ and receives from this tap a constant voltage which is so chosen that in case the potential of point *p* rises above the no-signal value, the diode is conductive, whereas in case the potential at point *p* falls below the no-signal value, the diode carries no current.

As the voltage impressed across the input 3—4 of the discriminator increases, the diode B3 effects the application of a higher negative potential on the capacitor C4. This negative potential is applied, via the delay network $R_1$ to $R_4$, $C_1$ and $C_2$ and the secondary of transformer TR to the grids of the amplifier tubes B1 and B2. Tube B1 is a variable $\mu$ tube, where tube B2 has a sharp cut-off characteristic. By connecting these tubes in parallel a large regulation range is obtained, so that for weak signals the arrangement has a very high mutual conductance, whereas for strong signals the mutual conductance is very low. The voltage variations which develop across the choke coil L1 are rectified by diode B4. The audio frequency component of the rectified voltage obtained across the points *q* and *r* is absorbed by the signal producing means which basically comprise an oscillatory circuit and tube B5. The oscillatory circuit is constituted by the parallel arrangement of choke coil L2 and condenser C6. The resonance frequency of this circuit lies between 5 and 15 c./s. Consequently the impedance is very high for these frequencies, so that between grid and cathode of amplifier tube B5 a voltage is applied which voltage varies in syllabic rhythm. The voltage variations developing across resistance R17 in the anode circuit of this tube are rectified via condenser C8 by a diode-rectifier G1. Condenser C7 constitutes a short circuit for audio frequency oscillations which might occur in the anode circuit of tube B5. Rectifier G1 is connected to the negative side of the supply source and resistance R9 which is connected in the cathode lead of tube B4.

With the receipt of speech current at the input 3—4, a voltage which is negative with respect to the cathode is applied to the grid of tube B6. This voltage should not vary in a syllabic rhythm, however, and the rectified voltage is accordingly smoothed by means of condenser C9 connected in parallel to rectifier G1 and resistances R18 and R19. On arrival of a syllable series of usable level, tube B6 is biassed to cut-off and relay S responsively releases. This relay cannot operate in the intervals between two syllables; this is achieved by the action of the said condenser C9 and resistance R18—R19, this arrangement having a large time constant. As a result of the connection of a rectifier G2 in parallel to resistance R19 condenser C9 is quickly charged, but it is slowly discharged.

The discriminator in intended to ascertain the presence of telephone currents of a certain minimum level. It is necessary, however, to equalize level variations as much as possible in that higher voltages at the points *s* and *t* will cause a greater delay in the arrangement of C9, R18 and R19, and this delay in turn will influence the operation of the load means which may comprise either the tube B6 or relay S, or both. By means of the AVC in the preamplifier tubes and the negative feedback in the circuits of the rectifiers B4 and G1, the desired independence of the input level is obtained. It is apparent from the foregoing that with the presence of speech of usable level at the input side of the discriminator, the apparatus is operative to effect the relese of relay S, which, in turn, at its contacts S1 closes a point in the control circuit for the adjustable attenuator equipment, whereby the transmission measuring set NM may control the attenuator as necessary to effect the desired constant level output.

Another embodiment of the discriminator according to the invention will be explained by means of Figure 2*b*.

The signal obtained from the radio receiver is applied to the primary I of transformer TR1, primary II passing on the signal to the variable attenuator. The secondary is connected to the control grids of a variable amplifier tube arrangement. As in Figure 2*a*, a variable $\mu$ tube has been connected in parallel with a sharp cut-off tube, whereby the discriminator may handle an extremely large range of signal levels. The amplified signal output of the preamplifier stage is applied to the diode D1 over capacitor C5. By means of half-wave rectification condenser C4 is rapidly charged, the rectified voltage being applied with some delay via R8 and C1 to the grids of tubes V1 and V2. The charge of condenser C1 takes place rather quickly (though not so quickly that the speech fluctuations would be impaired), whereas the discharge of C1 via R8 and R11 is so much delayed that in a normal conversation the amplifier retains the amplification to which it has been automatically adjusted without responding to the silences between the successive words of the incoming speech. In order to obtain as much amplification as possible with a level of —40 db, the diode D1 receives a biassing voltage derived from resistor R5 which is of a value which suspends the regulating action at low levels.

In order to obtain the syllabic frequency, the amplified signal is applied to the diode D2 via condenser C6 and resistor R13, the function of which will be set forth later. This diode is connected so that the alternate half-cycles of the A. C. voltage are rectified to charge condenser C7. The discharge of condenser C7 takes place through resistor R14. The syllabic frequency voltage developing across C7/R14 is applied via a filter consisting of R15, C8, C9, R17 to the grid of amplifier tube V3. After the amplifier tube V3, another filter has been provided which is comprised of R21, C10, R22, R23, C11 and C12. The two filters together have a frequency characteristic which permits frequencies of from 5 to 15 c./s. to pass, and which attenuates lower and higer frequencies.

The A. C. voltage output from the second filter is applied to the grid of the tube V4, which is arranged as a plate detector. This tube is so adjusted that the anode current only begins to flow when the voltage has attained a value corresponding to a speech fluctuation of about 10 db, this adjustment being effected to prevent noise fluctuating in speech rhythm from entailing a wrong re-adjusting command. A relay S is located in the anode circuit of tube V4, which relay, shunted by condenser C13 is slow to operate as well as slow to release. It is to be noted that, in contradistinction to the embodiment of Figure 2*a*, the arrangement is such that relay S operates with the appearance of speech currents at the input side of the discriminator.

Figure 2B:
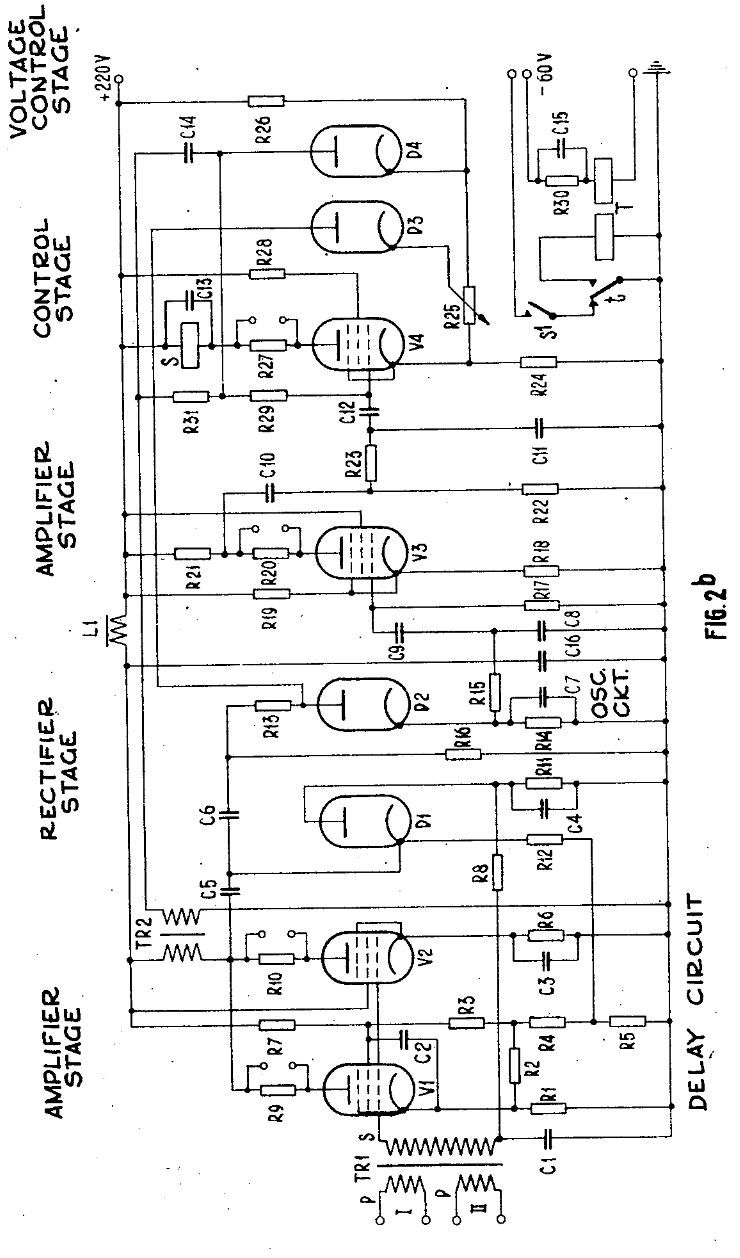

The action of the diodes D3 and D4 of the discriminator illustrated in Figure 2*b* is now set forth hereat. During a period of silence condenser C1 will discharge via resistors R8 and R11, which will lead to a larger amplification. Parasitic noises arriving under these conditions may be amplified too much during the adjustment of the preamplifier, so that condenser C7 is charged by diode D2 to a too high value, whereby an excessive voltage appears at the grid of amplifier tube V3. This opens the possibility for relay S to operate and give a command. In order to prevent condenser C7 from receiving an excessive charge, a diode D3 has been connected in parallel to diode D2 and condenser C7. Diode D3 is biased over resistors R24 and R25 so that at normal working voltages, it is non-conductive. In this manner diode D3 limits the value of voltage which may appear across the diode D2. In order to enhance the effectiveness of this measure, resistor R13 has been connected in series to the two diodes, which results in a still better control of the voltage. The limitation of the voltage appearing across diode D2 also effects a reduction in the voltage fluctuations whereby relay S will operate less rapidly and the preamplifier stage will be given an opportunity to reach its correct adjustment.

A second protection against the operation of relay S on account of disturbances is achieved by means of diode D4. The voltage obtained via transformer TR2 from the preamplifier is rectified by diode D4, which is biased by such a voltage that with the normal operation of the whole apparatus no rectification takes place. Condenser C14 is charged by D4 and is connected to the negative grid bias of tube V4 in such a manner that the grid of this tube is rendered more negative by the operation of D4. In consequence tube V4, which is arranged as a plate detector, becomes less negative, so that the chance of operating relay S responsive to transient disturbances is once more reduced.

If the period of speech is sufficiently long (e. g. 1 second or more), the preamplifier will have time to find its correct adjustment, and the A. C. voltage on the anodes of V1 and V2 will no longer increase in a degree as to exceed the bias voltages of $D_3$ and $D_4$. The diodes $D_3$ and $D_4$ are put out of action, so that the discriminator obtains the sensitivity necessary to energize relay S.

The arrangement and the relays of the transmission measuring set are quick operating. As a result in an interval of silence, the minimum relay of the transmission measuring set would release sooner than relay S (which has been afforded slow operating characteristics) and at the end of each interval of speech an unwanted command would be given for increasing the speech level. In order to avoid this undesired effect, the discriminator is provided with a relay T, which is quick operating and slow releasing. It is energized by the minimum relay of the transmission measuring set and corresponds to the T-relay of Figure 2*a*. A period of delay in release is provided which permits relay S to release before relay T. In order to make the relay operate as quick as possible, a resistance R30 shunted by a condenser C15 has been connected in series with the relay winding.

Figure 3:
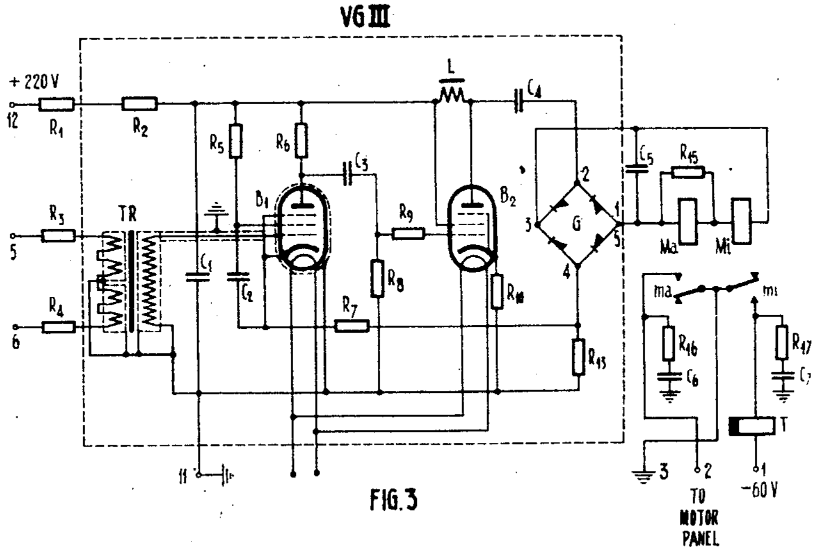

The transmission measuring set consists of an amplifier which controls the two relays M*a* and M*i* over rectifier network G. Figure 3 shows by way of example an embodiment favorable for the invention.

The input, points 5 and 6, is connected via an attenuator V*z* (Figure 1) to the output of amplifier V*s*. The voltages occurring at these points are applied over transformer TR to the grid and cathode of tube B1. The voltage variations found in the anode circuit of this tube are applied by means of resistive coupling to tube B2. A rectifier G is connected to the latter by means of inductive coupling. In the circuit of rectifier G there is a resistance R13, over which the cathode current of the first tube flows. The resulting negative feedback makes the amplifier work with a great constancy. Rectifier G controls the two relays M*a* and M*i*. C5 is a smoothing condenser. The windings of the two relays, as well as the shunt resistance across M*a* are chosen so that in the operating range, both the relays are excited by equal numbers of ampere turns.

With an average input level, relay M*i* is energized. It releases if the level falls in such a degree that readjustment becomes necessary. In that case contact *mi* is opened, and relay T releases to apply positive voltage to terminal 1 of the motor panel.

Figure 4:
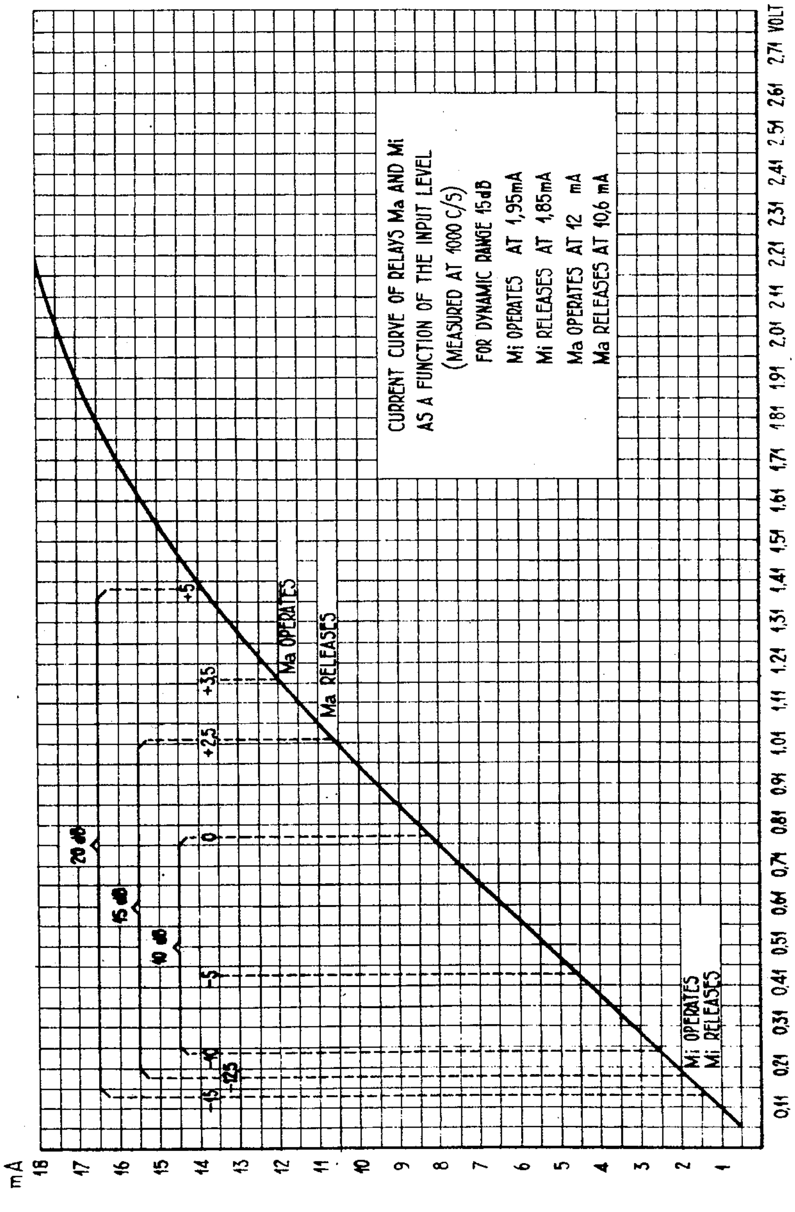
Figure 4 is a graph illustrating the operation of the transmission measuring set of Figure 3.

It is clear that such an arrangement of the transmission measuring set makes it possible to keep the output level of amplifier V*s* within an interval of 15 db by switching in the motor when the minimum limit, or maximum limit, respectively is exceeded. These limits may, of course be changed by readjusting the relays. Figure 4 shows graphically the coherence between the input level of the transmission measuring set and the relay currents, and indicates at the same time the adjusting limits for a dynamic of 10, 15 and 20 db.

Figure 5:
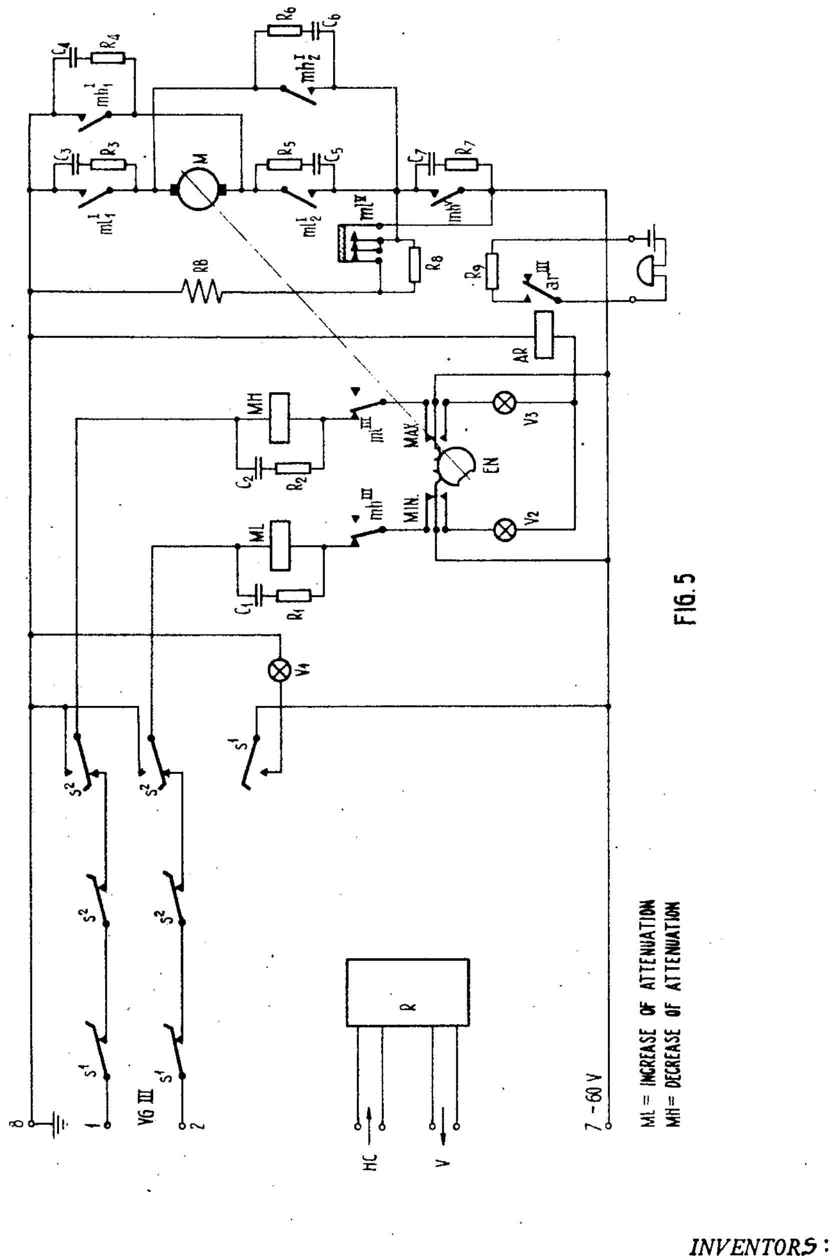
Figure 5 shows the arrangement of the motor circuit of the regulator.

It will be seen from the detailed diagram (Figure 5) of the motor panel that voltage applied to point 1 or 2 causes the operation of relay MH or ML respectively. In the former case (+) voltage applied to point 1 as a result of too low a level at the input side of the apparatus, relay MH is energized in the following circuit: earth, point 1, winding MH, contact $ml^{III}$, maximum contact *max*, point 7, −60 v. As a result the motor is operated to increase the level: earth, point 8, contact $mh_1{}^{I}$, armature winding M, contact $mh_V{}^{I}$, contact $mh^V$ point 7, −60 v., and point 8 field winding RB, contact $mh^V$ point 7, −60 v.

If voltage is applied to point 2, relay ML is energized in the following circuit: earth, contacts *ma* point 2, winding ML, contact $mh^{III}$ minimum contact *min.*, point 7, −60 v. Contacts of ML switch in the motor, this time, however, in an opposite direction, so that the level is decreased. The circuit runs as follows: earth, point 8, contact $ml^{I}$, armature winding M, contact $ml_2{}^{I}$, contact $ml^V$, point 7, −60 v., and point 8, field winding RB, resistor R8, contact $ml^V$, point 7, −60 v.

In order to avoid distortion, overload of amplifiers, etc. in consequence of too high a level, the reducing of high levels should be effected as quickly as possible. For this reason contact $ml^V$ connects a resistor R8 in series with the field winding. As a result of the weakening of the field the motor will turn at a higher speed.

As a simultaneous excitation of the two relays MH and ML, which occur in the case of rapid level changes, would result in a short-circuit of the battery voltage, contacts have been applied by which the relays break each other's circuit.

In case it turns out to be impossible to readjust the level sufficiently in an upward or downward direction, the regulator will reach its final position. If the level is too low, relay MH is switched out by shaft contact *max*, which at the same time switches in lamp V3 and alarm relay AR. If the level is too high, the shaft contact *min* disconnects relay ML and switches in lamp V2 and alarm relay AR. Relay AR, which operates in both cases, switches in an alarm system.

A second variable attenuator GO set forth in block form in Figure 1 provides either a high or a low degree of attenuation in accordance with the presence or absence of speech current at the input side of the apparatus. During intervals of silence the total attenuation which occurs in the system is increased by an amount of about 20 db whereby transient disturbances and noises caused by atmospheric and other power load conditions are prevented from effecting false operation of the equipment. The discriminator apparatus is connected to control the second attenuator in the manner of the adjustable attenuation network described heretofore, whereas the second attenuator may be embodied in various forms. A favorable embodiment of the noise limiter is one in which a static relay opens or closes by means of a bridge circuit of resistors. Figure 6 shows such an arrangement. If contact $s^2$ is in the position shown, rectifier cells G3 and G4 receive a blocking voltage and rectifier cells G1 and G2 receive a passing voltage, which results in a large attenuation from TR2 to TR3. The taps on resistor R9 are placed at such points that the polarity is reversed when contact $s^2$ is closed, so that then the rectifier cells G3 and G4 get a passing voltage and rectifier cells G1 and G2 get a blocking voltage, and the attenuation becomes small. Contact $s^2$ is a contact of the discriminator relay S. The control of the second attenuator by the discriminator secures the result that in the intervals of silence the noise is considerably weaker, which highly benefits the quality of the connection.

It is pointed out that the application of the second attenuator differs from the way in which it was used in the U. S. patent applications Ser. Nos. 189,411 and 189,412, also in connection with the location of the automatic volume regulator in the incoming branch.

It may be noted, finally, that all the contacts in motor circuit, discriminator transmission measuring set and second attenuator are shunted by series connections of a condenser and a resistor as spark quenches and in general to eliminate disturbances.

While we have illustrated and described what we regard to be the preferred embodiment of our invention, nevertheless it will be understood that such is merely exemplary and that numerous modifications and rearrangements may be made therein without departing from the essence of the invention, we claim:

1. A speech discriminator for detecting syllabic frequencies in speech channels, an input path over which said speech signals are received, a first signal responsive means coupled to said input path for producing an output signal only responsive to the occurrence of signals in said input path of a voltage value which exceeds a predetermined minimum value, signal control means connected to the input of said amplifier means for producing signals for maintaining the output of said amplifier means substantially constant independent of variations of the value of said speech signals received over said input path, signal producing means connected to said first signal responsive means for producing output signals only responsive to the occurrence of signals of said voltage value in said input path which have a syllabic rhythm, and control means connected to said signal producing means for operation between different conditions responsive to initiation and to termination of the signal output of said signal producing means.

2. A speech discriminator for detecting syllabic frequencies in speech signals, an input path over which said speech signals are received, a first signal responsive means connected to said input path for producing an output signal only with the receipt of signals of a voltage value that exceeds a predetermined minimum value, a rectifier means connected to the output side of said amplifier means to rectify the output of said amplifier means; a delay network including a negative feed-back circuit connected to extend a sampling of the rectified output of said amplifier means back to the input of said amplifier means to render same independent of variations of the voltage levels of said speech currents in said input path which exceed a predetermined voltage value, signal producing means including means connected to the output of said amplifier means for producing a signal output only responsive to the occurrence of signals in the syllabic frequency range, and control means including load means connected to said signal producing means for operation between different conditions of operation responsive to initiation and to termination of the signal output of said signal producing means.

3. An arrangement as set forth in claim 2 in which said amplifier means includes a variable $\mu$ tube and a second tube having a sharp cut-off characteristic connected in parallel arrangement to provide an increased regulation range.

4. An arrangement as set forth in claim 2 in which said negative feed-back circuit includes an RC circuit which is operative responsive to occurrence of an increased output by said amplifier means to provide an increased negative bias signal to the input of said amplifier means to thereby maintain the output of said amplifier means at a substantially constant value.

5. A speech discriminator for detecting syllabic frequencies in speech signals, an input path over which said speech signals are received, a first signal responsive means connected to said input path to operate only with receipt thereover of signals of a voltage level greater than a predetermined minimum value, a rectifier means connected to said signal responsive means for rectifying the alternate half cycles of the signal output of said amplifier means, delay circuit means comprising means for extending an increased negative biasing signal back to the input side of the amplifier means with each increase in the amplifier means output to render same independent of fluctuations in the voltage level of the signals received over said input path, means including an oscillatory circuit operative with the occurrence of signals in the syllabic frequency range to provide output signals which vary in syllabic rhythm therewith, and a control means including load means operated between different conditions of operation by the initiation and termination of said syllabic rhythm output signals.

6. In a speech discriminator for detecting syllabic frequencies in speech signals, an input path over which said speech signals are received, a first amplifier means connected to said input path, feedback circuit means connected to the output side of the amplifier means for providing a bias signal to the input side of said amplifier means which is of a value to maintain the output of said means at a substantially constant value, signal producing means connected to the output side of said amplifier means for producing a signal which varies in a syllabic rhythm with the frequencies on said input path only with receipt of a signal of a syllabic frequency, and control means including load means operated between at least two conditions by said signals to control associated equipment in its operation between correspondingly different conditions, and time delay means connected between the output side of said signal producing means and said load means to introduce a time delay in the operation of the load means to prevent false operation between the two conditions responsive to a syllabic pause in speech frequency receipt.

7. A speech discriminator as set forth in claim 6 which includes means connected to the output side of said signal producing means for intercepting audible frequency currents prior to application of the signals to said time delay means and said load means.

8. In a speech discriminator for detecting syllabic frequencies in speech signals, an input path over which speech frequencies are received, a first amplifier means connected to said input path, rectifier means connected to the output side of the amplifier means for rectifying the output of said amplifier means, signal producing means, including an oscillatory circuit connected to the output side of said rectifier means, for producing a signal which varies in a syllabic rhythm with the frequencies applied to said input path only with receipt of a signal of a syllabic frequency, and a second amplifier means connected to the output side of said oscillatory circuit; a rectifier circuit and smoothing circuit connected to the output side of said second amplifier means to rectify and smooth the signal output thereof and control means including load means connected to said rectifier and smoothing circuit for operation between two conditions responsive to the receipt and termination of signals of a syllabic rhythm by said signal producing means.

9. In a speech discriminator for detecting syllabic frequencies in speech signals, an input path over which said speech frequencies are received, a first amplifier means connected to said input path, a first rectifier means comprising a first and second rectifier member connected to said first amplifier means for rectifying alternate half cycles of the signal output of said amplifier means, signal producing means including oscillatory means connected to the output of said first rectifier means for producing a signal which varies in a syllabic rhythm with the frequencies applied to said input path only responsive to receipt of a signal of a syllabic frequency, a first control means comprising load means operative to different conditions responsive to the initiation and alternatively the termination of the syllabic rhythm signals produced by said oscillatory means, voltage control means comprising a third and fourth rectifier member, a first biasing means for said third rectifier member, means connecting said third rectifier member and said biasing means in parallel with said second rectifier member for operation only responsive to the voltage level at said second rectifier member surpassing a given value determined by said biasing means, additional biasing means, means for coupling said fourth rectifier member between said additional biasing means and the input path to respond to signals on said path, and means for coupling said fourth rectifier means to said control means to render same less sensitive to noises during silent periods.

10. In a speech discriminator for detecting syllabic frequencies in speech signals, an input path over which said speech frequencies are received, a first amplifier means connected to said input path, a first rectifier means comprising a first and second rectifier member connected to said amplifier means for rectifying the alternate half cycles of the signal output of said amplifier means, oscillatory means connected to the output of said rectifier means for producing a signal which varies in a syllabic rhythm with the frequencies applied to said input path only with receipt of a signal in the syllabic range, a second amplifier means coupled to the output side of said oscillatory means, control means coupled to the output side of said second amplifier means including a load means operative between different conditions in response to the initiation and alternatively the termination of said syllabic rhythm signals, and voltage control means comprising a third and fourth rectifier member and biasing means for said fourth rectifier member, means for connecting said third rectifier member between said second rectifier member and an intermediate point on said biasing means in parallel with said second rectifier member, means for connecting said fourth rectifier member between said first amplifier means and said biasing means for operation only with the occurrence of an output signal at said amplifier means which surpasses a predetermined voltage level set thereby, including a capacitor member connected in circuit with said fourth rectifier member, and resistor means connecting said fourth rectifier member and said capacitor member to said control means to render said load means less sensitive to noises and disturbing currents during silent periods.

References Cited in the file of this patent

UNITED STATES PATENTS

| | | |
|---|---|---|
| 1,447,773 | Espenschied et al. | Mar. 6, 1923 |
| 1,762,953 | Black | June 10, 1930 |
| 1,811,954 | Mitchell et al. | June 30, 1931 |
| 1,811,955 | Mitchell et al. | June 30, 1931 |
| 1,971,679 | Dudley | Aug. 28, 1934 |
| 2,284,617 | Barney | June 2, 1942 |
| 2,590,973 | Jordan | Apr. 1, 1952 |
| 2,621,808 | Blakeney | Dec. 16, 1952 |
| 2,678,386 | Bradley | May 11, 1954 |
| 2,694,162 | English | Nov. 9, 1954 |
| 2,704,326 | Whitson et al. | Mar. 15, 1955 |